United States Patent
Han et al.

(10) Patent No.: US 11,782,604 B2
(45) Date of Patent: Oct. 10, 2023

(54) IO REQUEST FLOW PERFORMANCE ANALYSIS SYSTEM AND METHOD

(71) Applicant: EMC IP Holding Company, LLC, Hopkinton, MA (US)

(72) Inventors: Geng Han, Beijing (CN); Vladimir Shveidel, Pardes-Hana (IL); Jibing Dong, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 200 days.

(21) Appl. No.: 17/383,587

(22) Filed: Jul. 23, 2021

(65) Prior Publication Data
US 2023/0025962 A1     Jan. 26, 2023

(51) Int. Cl.
    *G06F 3/06* (2006.01)

(52) U.S. Cl.
    CPC .......... *G06F 3/0613* (2013.01); *G06F 3/0611* (2013.01); *G06F 3/0653* (2013.01); *G06F 3/0659* (2013.01); *G06F 3/067* (2013.01)

(58) Field of Classification Search
    CPC ........................ G06F 3/061; G06F 11/3072
    See application file for complete search history.

(56) References Cited

U.S. PATENT DOCUMENTS

| | | | |
|---|---|---|---|
| 10,719,249 B1* | 7/2020 | Meiri et al. | G06F 3/061 |
| 2019/0306173 A1* | 10/2019 | Reddy et al. | G06F 11/3604 |
| 2020/0349427 A1* | 11/2020 | Sousa et al. | G06N 3/084 |
| 2020/0364163 A1* | 11/2020 | Schauer et al. | G06F 13/4282 |
| 2022/0405187 A1* | 12/2022 | Chen et al. | G06F 11/3072 |

* cited by examiner

*Primary Examiner* — Getente A Yimer
(74) *Attorney, Agent, or Firm* — Brian J. Colandreo; Heath M. Sargeant; Holland & Knight LLP

(57) ABSTRACT

A method, computer program product, and computing system for executing a plurality of IO traces on a storage system. At least one vertical flow and at least one horizontal flow associated with the at least one vertical flow may be defined for the plurality of IO traces. A hierarchical representation of the plurality of IO traces may be generated with the at least one vertical flow and the at least one horizontal flow associated with the at least one vertical flow defined for the plurality of IO traces.

20 Claims, 6 Drawing Sheets

| FlushActor | ins_id: 000000000000101 | req: 5000d67850 | flow: LockWaitSeq step:..... |
| FlushActor | ins_id: 000000000001011 | req: 500099b990 | flow: TxCommitSeq step:..... |
| FlushActor | ins_id: 000000000010111 | req: 5000d99b90 | flow: IO_ASYNC step:..... |
| FlushActor | ins_id: 000000000010112 | req: 500099b600 | flow: IO_ASYNC step:..... |
| FlushActor | ins_id: 000000000000102 | req: 5000357b70 | flow: DP_RAID step:..... |

```
NamespaceObjectIoActor ->      Start   avg: 7 microseconds
      TxBeginSeq -> _Start      avg: 0 microseconds
      TxBeginSeq -> _ReserveTx      avg: 1 microsecond
      TxBeginSeq -> _WaitForLogAndWritePool      avg: 1 microsecond
      TxBeginSeq -> _ReserveDataCachePages      avg: 2 microseconds
      TxBeginSeq -> Finalize
NamespaceObjectIoActor ->      ValidateReport      avg: 0 microsecond
      FilestoreObjectSubmitIoActor      ->      ValidateRequest      avg: 0 microseconds
      FilestoreObjectSubmitIoActor      ->      ObtainInode  avg: 5 microseconds
      FilestoreObjectSubmitIoActor      ->      GetDataBuffer      avg: 10 microseconds
      FilestoreObjectSubmitIoActor      ->      CompleteOperation
NamespaceObjectIoActor ->      CompleteOperation avg: 543 microseconds
      TxCommitSeq      ->      _StartCommit      avg: 0 microseconds
      TxCommitSeq      ->      _StartCommitLockAcquire avg: 1 microsecond
      TxCommitSeq      ->      _LogDirtyPages      avg: 167 microseconds
            DP_RAID      ->      cyc_raid_transport_start_io      avg: 160 microseconds
                  DP_BACKEND      ->      cyc_be_start_io_request   avg: 108 microseconds
                  DP_BACKEND      ->      cyc_backend_io_complettion
                  TRQ_ASYNC      ->      IoRequestCompletionAsyncStart  avg. 43 microseconds
                  TRQ_ASYNC      ->      IoRequestCompletionAsyncEnd
            DP_RAID      ->      cyc_raid_transport_start_io_completion
      TxCommitSeq      ->      _AllocateSpace      avg: 0 microseconds
      TxCommitSeq      ->      _SendCommit      avg: 363 microseconds
            TRQ_ASYNC      ->      IoRequestCompletionAsyncStart  avg: 39 microseconds
            TRQ_ASYNC      ->      IoRequestCompletionAsyncEnd
      TxCommitSeq      ->      _UpdateLogPagePersistents      avg: 1 microsecond
      TxCommitSeq      ->      _CommitMem      avg: 5 microseconds
NamespaceObjectIoActor ->      Finalize
```

Overall latency: 7 + 17 + 543 = 567 microseconds

FIG. 6

IO REQUEST FLOW PERFORMANCE ANALYSIS SYSTEM AND METHOD

BACKGROUND

Storing and safeguarding electronic content may be beneficial in modern business and elsewhere. Accordingly, various methodologies may be employed to protect and distribute such electronic content.

When input/output (IO) requests are executed on a storage system, additional IO sub-requests or child IO requests may be executed. Conventional approaches to analyzing the performance of IO requests generally fail to account for the hierarchical execution flow of IO requests. Accordingly, these conventional approaches may be unable to determine an accurate latency, or other performance-related metric, associated with the execution of a plurality of IO requests.

Additionally and as will be discussed in greater detail below, IO traces may be executed to test various performance metrics associated with the storage system. However, these IO traces may be interleaved in conventional sequential listings of executed IO traces. Accordingly, it may be difficult to determine a latency or other performance-related metrics for the execution of IO traces. For example, conventional approaches to determining the executional cost of an IO request or IO trace include a comparison of a starting timestamp and an ending timestamp. However, as IO request flows may generate hundreds of thousands IO traces, some of the IO traces may be serialized and some IO traces may be generated concurrently. Accordingly, it may be difficult to analyze the cost of each step for complicated flows through regular and non-related traces.

SUMMARY OF DISCLOSURE

In one example implementation, a computer-implemented method executed on a computing device may include, but is not limited to, executing a plurality of IO traces on a storage system. At least one vertical flow and at least one horizontal flow associated with the at least one vertical flow may be defined for the plurality of IO traces. A hierarchical representation of the plurality of IO traces may be generated with the at least one vertical flow and the at least one horizontal flow associated with the at least one vertical flow defined for the plurality of IO traces.

One or more of the following example features may be included. Defining the at least one vertical flow and at least one horizontal flow associated with the at least one vertical flow may include associating a unique parent IO request identifier and a unique instance identifier with a parent IO request. Defining the at least one vertical flow and at least one horizontal flow associated with the at least one vertical flow may include associating the unique parent IO identifier with at least one child IO request. Defining the at least one vertical flow and at least one horizontal flow associated with the at least one vertical flow may include associating at least one unique instance identifier with each child IO request based upon, at least in part, the unique instance identifier associated with the parent IO request. An execution latency may be defined for the at least one horizontal flow associated with the at least one vertical flow. An execution latency may be defined for the at least one vertical flow based upon, at least in part, the execution latency defined for the at least one horizontal flow associated with the at least one vertical flow. Generating the hierarchical representation of the plurality of IO traces with the at least one vertical flow and the at least one horizontal flow associated with the at least one vertical flow defined for the plurality of IO traces may include reformatting a list including the plurality of IO traces from a sequential execution representation to a hierarchical execution representation.

In another example implementation, a computer program product resides on a computer readable medium that has a plurality of instructions stored on it. When executed by a processor, the instructions cause the processor to perform operations that may include, but are not limited to, executing a plurality of IO traces on a storage system. At least one vertical flow and at least one horizontal flow associated with the at least one vertical flow may be defined for the plurality of IO traces. A hierarchical representation of the plurality of IO traces may be generated with the at least one vertical flow and the at least one horizontal flow associated with the at least one vertical flow defined for the plurality of IO traces.

One or more of the following example features may be included. Defining the at least one vertical flow and at least one horizontal flow associated with the at least one vertical flow may include associating a unique parent IO request identifier and a unique instance identifier with a parent IO request. Defining the at least one vertical flow and at least one horizontal flow associated with the at least one vertical flow may include associating the unique parent IO identifier with at least one child IO request. Defining the at least one vertical flow and at least one horizontal flow associated with the at least one vertical flow may include associating at least one unique instance identifier with each child IO request based upon, at least in part, the unique instance identifier associated with the parent IO request. An execution latency may be defined for the at least one horizontal flow associated with the at least one vertical flow. An execution latency may be defined for the at least one vertical flow based upon, at least in part, the execution latency defined for the at least one horizontal flow associated with the at least one vertical flow. Generating the hierarchical representation of the plurality of IO traces with the at least one vertical flow and the at least one horizontal flow associated with the at least one vertical flow defined for the plurality of IO traces may include reformatting a list including the plurality of IO traces from a sequential execution representation to a hierarchical execution representation.

In another example implementation, a computing system includes at least one processor and at least one memory architecture coupled with the at least one processor, wherein the at least one processor is configured to a execute a plurality of IO traces on a storage system. The at least one processor may be further configured to define, for the plurality of IO traces, at least one vertical flow and at least one horizontal flow associated with the at least one vertical flow. The at least one processor may be further configured to generate a hierarchical representation of the plurality of IO traces with the at least one vertical flow and the at least one horizontal flow associated with the at least one vertical flow defined for the plurality of IO traces.

One or more of the following example features may be included. Defining the at least one vertical flow and at least one horizontal flow associated with the at least one vertical flow may include associating a unique parent IO request identifier and a unique instance identifier with a parent IO request. Defining the at least one vertical flow and at least one horizontal flow associated with the at least one vertical flow may include associating the unique parent IO identifier with at least one child IO request. Defining the at least one vertical flow and at least one horizontal flow associated with the at least one vertical flow may include associating at least one unique instance identifier with each child IO request based upon, at least in part, the unique instance identifier associated with the parent IO request. An execution latency may be defined for the at least one horizontal flow associated with the at least one vertical flow. An execution latency may be defined for the at least one vertical flow based upon, at least in part, the execution latency defined for the at least one horizontal flow associated with the at least one vertical flow. Generating the hierarchical representation of the plurality of IO traces with the at least one vertical flow and the at least one horizontal flow associated with the at least one vertical flow defined for the plurality of IO traces may include reformatting a list including the plurality of IO traces from a sequential execution representation to a hierarchical execution representation.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 4 is an example diagrammatic view of a plurality of IO traces according to one or more example implementations of the disclosure;

FIG. 6 is an example diagrammatic view of a hierarchical execution representation generated for a plurality of IO traces according to one or more example implementations of the disclosure.

Like reference symbols in the various drawings indicate like elements.

DETAILED DESCRIPTION

System Overview

Figure 1:
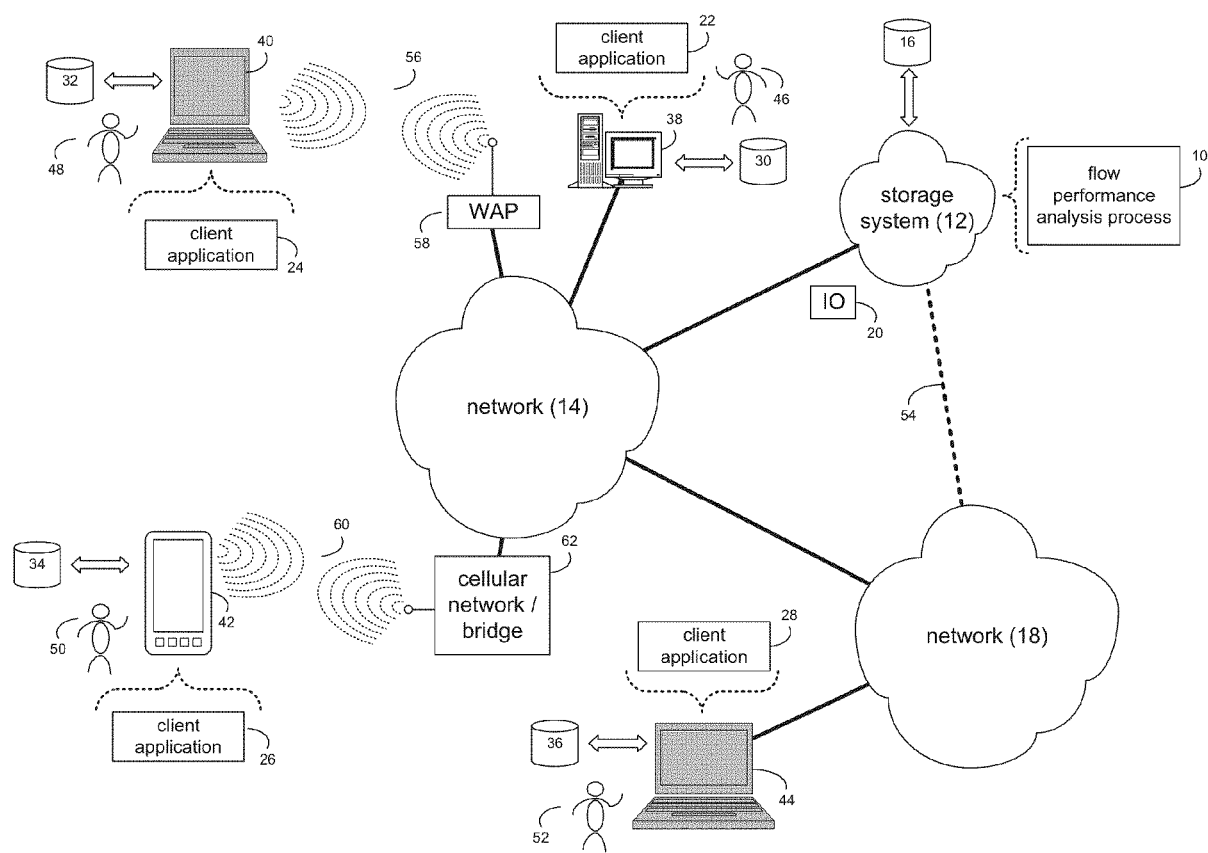
FIG. 1 is an example diagrammatic view of a storage system and a flow performance analysis process coupled to a distributed computing network according to one or more example implementations of the disclosure.

Referring to FIG. 1, there is shown flow performance analysis process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of flow performance analysis process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally / alternatively, some portions of the instruction sets and subroutines of flow performance analysis process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11 g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network / bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a flow performance analysis process, such as flow performance analysis process 10 of FIG. 1, may include but is not limited to, executing a plurality of IO traces on a storage system. At least one vertical flow and at least one horizontal flow associated with the at least one vertical flow may be defined for the plurality of IO traces. A hierarchical representation of the plurality of IO traces may be generated with the at least one vertical flow and the at least one horizontal flow associated with the at least one vertical flow defined for the plurality of IO traces.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
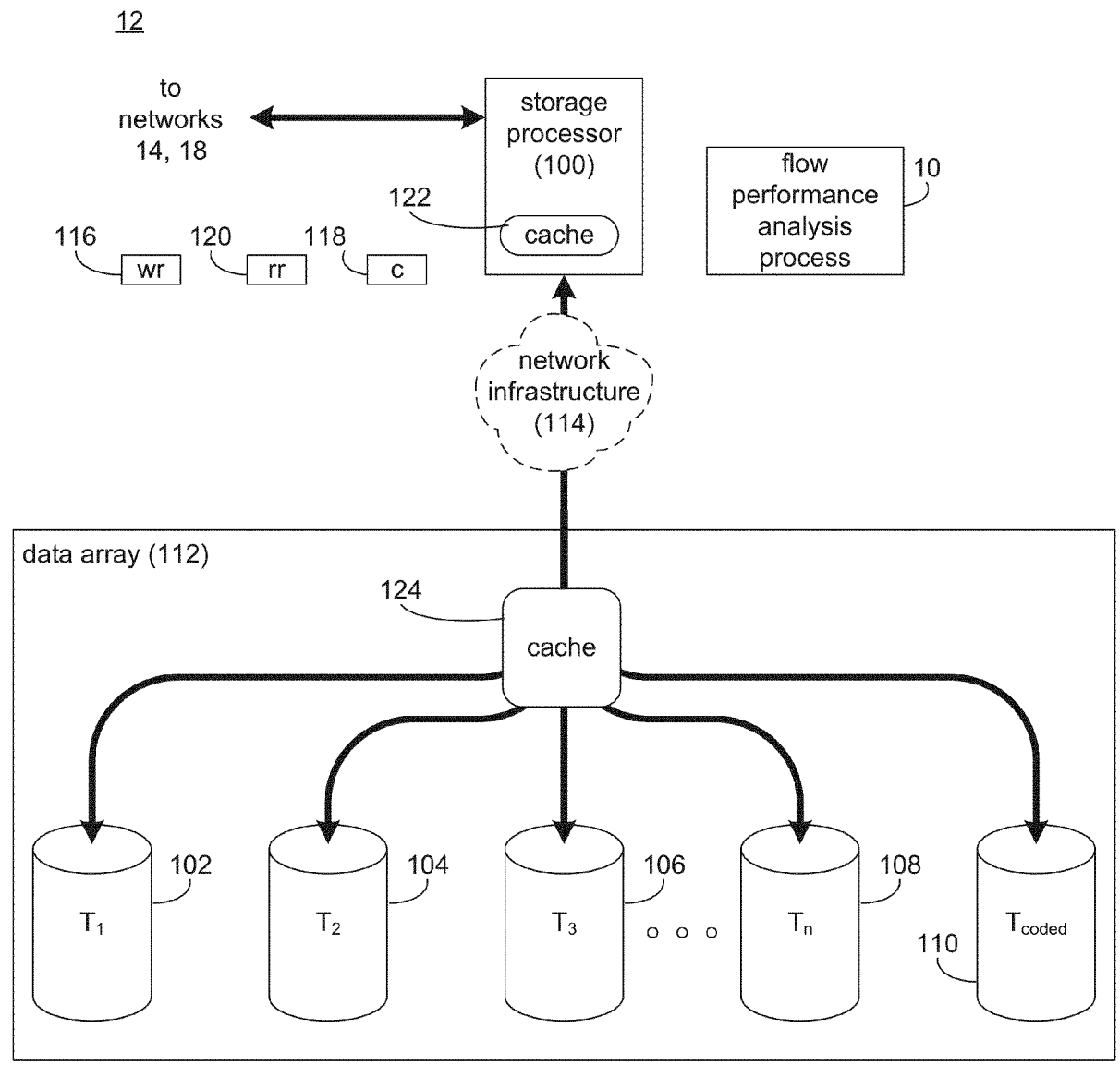
FIG. 2 is an example diagrammatic view of the storage system of FIG. 1 according to one or more example implementations of the disclosure.
Figure 3:
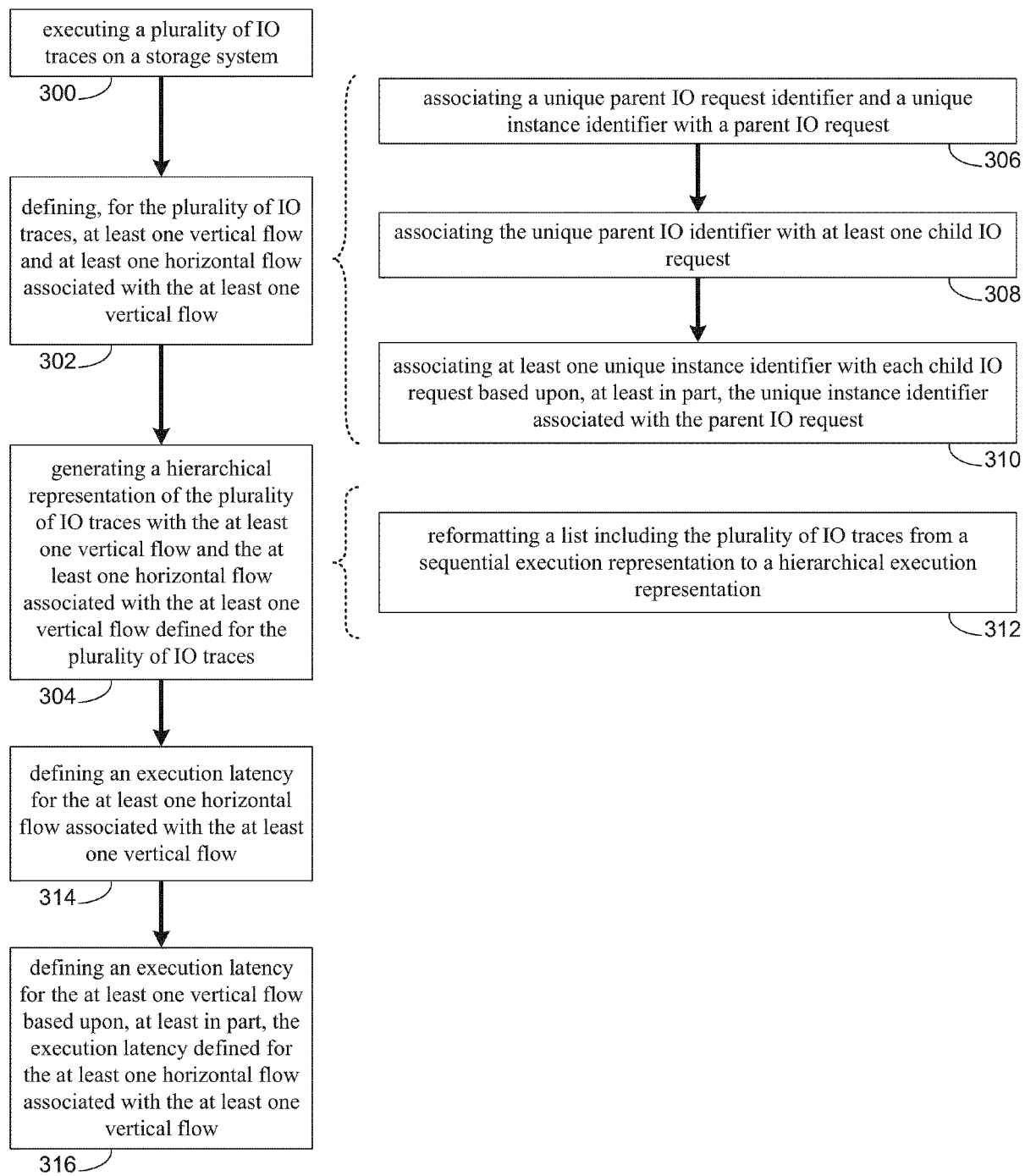
FIG. 3 is an example flowchart of flow performance analysis process according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy / performance / capacity required.

Storage system 12 may also include one or more coded targets 110. As is known in the art, a coded target may be used to store coded data that may allow for the regeneration of data lost / corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy / performance / capacity required.

Examples of storage targets 102, 104, 106, 108 and coded target 110 may include one or more electro-mechanical hard disk drives and/or solid-state / flash devices, wherein a combination of storage targets 102, 104, 106, 108 and coded target 110 and processing / control systems (not shown) may form data array 112.

The manner in which storage system 12 is implemented may vary depending upon e.g. the level of redundancy / performance / capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/ or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched / packet switched network.

Storage system 12 may execute all or a portion of flow performance analysis process 10. The instruction sets and subroutines of flow performance analysis process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of flow performance analysis process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally / alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally / alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of flow performance analysis process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of flow performance analysis process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Flow Performance Analysis Process

Referring also to the examples of FIGS. 3-6 and in some implementations, flow performance analysis process 10 may execute 300 a plurality of IO traces on a storage system. At least one vertical flow and at least one horizontal flow associated with the at least one vertical flow may be defined 302 for the plurality of IO traces. A hierarchical representation of the plurality of IO traces may be generated 304 with the at least one vertical flow and the at least one horizontal flow associated with the at least one vertical flow defined for the plurality of IO traces.

As will be discussed in greater detail below, implementations of the present disclosure may allow for improved performance analysis of IO request flows. For example, when IO requests are executed on a storage system, additional IO sub-requests or child IO requests may be executed. Conventional approaches to analyzing the performance of IO requests generally fail to account for the hierarchical execution flow of IO requests. Accordingly, these conventional approaches may be unable to determine an accurate latency, or other performance-related metric, associated with the execution of a plurality of IO requests.

Additionally and as will be discussed in greater detail below, IO traces may be executed to test various performance metrics associated with the storage system. However, these IO traces may be interleaved in conventional sequential listings of executed IO traces. Accordingly, it may be difficult to determine a latency or other performance-related metrics for the execution of IO traces. For example, conventional approaches to determining the execution cost of an IO request or IO trace include a comparison of a starting timestamp and an ending timestamp. However, as IO request flows may generate hundreds of thousands of IO traces, some of the IO traces may be serialized and some IO traces may be generated concurrently. Accordingly, it may be difficult to analyze the cost of each step for complicated flows through regular and non-related IO traces.

In some implementations, flow performance analysis process 10 may execute 300 a plurality of IO traces on a storage system. For example, when testing and/or troubleshooting the processing of IO requests on a storage system, the storage system may be configured to generate IO traces. An IO trace may generally include information or a record associated with the processing of an IO request on the storage system (e.g., a list of hardware and/or software components used to process the IO request, the originating client device, a description of the IO path, a timestamp of IO request arrival and processing, a total execution time, etc.). In this manner, a user at a client computing device may determine how an IO request is processed by a storage system by using the IO trace received back from the storage system. Referring also to FIG. 4 and in some implementations, flow performance analysis process 10 may execute 300 a plurality of IO traces (e.g., plurality of IO traces 400). As shown in FIG. 4, as IO traces are executed, flow performance analysis process 10 may receive plurality of IO traces 400 and may, at least initially, define a sequential listing of IO traces 400 executed on the storage system.

When executing 300 IO traces on a storage system, IO traces may execute IO sub-traces which may execute further IO sub-traces. As will be discussed in greater detail below, the various execution flows may be defined generally as vertical flows and horizontal flows. In some implementations, flow performance analysis process 10 may selectively enable the execution of IO traces per CPU core; for a particular vertical flow; and/or for a particular horizontal flow. In this manner, the execution of IO traces may be selectively enabled for particular IO traces, particular portions of an IO trace flow, and/or for CPU cores. For example, a user may, via a user interface, selectively enable the execution of particular IO traces (e.g., per CPU core, per vertical flow, and/or per horizontal flow).

In some implementations, flow performance analysis process 10 may define 302, for the plurality of IO traces, at least one vertical flow and at least one horizontal flow associated with the at least one vertical flow. Flow performance analysis process 10 may abstract the smallest logical unit of IO request execution as a flow. For example, a flow may be implemented as a "RequestActor" in logger/mapper, or it could be implemented as a Sequencer in TxCache, or it could also be implemented a state machine in RAID (i.e., parity read verify state machine). Accordingly, the functionality of an entire data path of a storage system may be composed of various flows.

Figure 5:
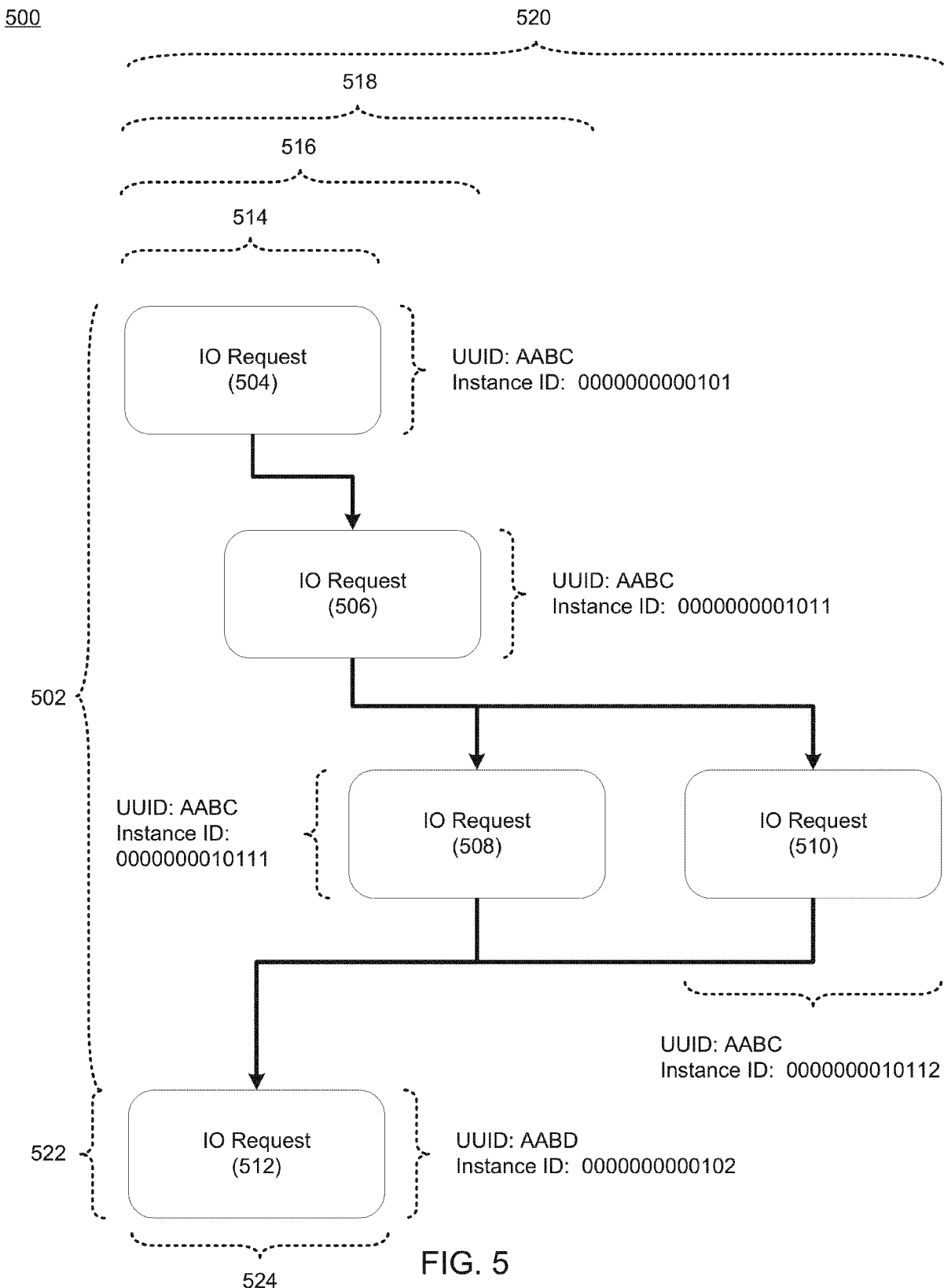
FIG. 5 is an example diagrammatic view of at least one vertical flow and at least one horizontal flow according to one or more example implementations of the disclosure.

Referring also to FIG. 5, flow performance analysis process 10 may define 302, for plurality of IO traces 400, at least one vertical flow (e.g., vertical flow 502). A vertical flow may generally include a series or combination of IO requests that implement higher level functionality. For example, a user data flush flow, a metadata log destage flow, an IO ingesting flow, etc. In this manner, a vertical flow may include a plurality of dependent IO requests that execute some combined functionality. In the example of FIG. 5, vertical flow 502 may include a plurality of IO requests (e.g., IO requests 504, 506, 508, 510). In this example, IO request 504 may execute one or more IO sub-requests. Accordingly, IO request 504 may be a "parent IO request" that may execute one or more "child IO requests". Suppose that IO request 504 executes IO request 506 which, in turn, executes IO requests 508, 510 concurrently. Following the execution of IO requests 508, 510, IO request 504 may be completed and IO request 512 (or any other subsequent IO request) may be executed. In this manner, flow performance analysis process 10 may define 302 the combination of IO requests 504, 506, 508, 510 as vertical flow 502 as each of these IO requests are dependently executed.

Flow performance analysis process 10 may define 302, for plurality of IO traces 400, at least one horizontal flow (e.g., horizontal flows 514, 516, 518, 520) associated with at least one vertical flow (e.g., vertical flow 502). A horizontal flow may generally include one or more IO requests that implement a specific fundamental functionality. As discussed above, vertical flows may combine multiple horizontal flows to implement a high-level functionality. Accordingly, a horizontal flow may include one or more child IO requests executed during the execution of a parent IO request. Returning to the above example, suppose that IO request 504 executes IO request 506 which, in turn, executes IO requests 508, 510 concurrently. In this example, flow performance analysis process 10 may define 302 horizontal flow 514 as the execution of IO request 504; horizontal flow 516 as the further execution of IO request 506; horizontal flow 518 as the further execution of IO request 508; and horizontal flow 520 as the further execution of IO request 510. While vertical flow 502 includes e.g., four horizontal flows 514, 516, 518, 520, it will be appreciated that vertical flow 502 may include any number of horizontal flows within the scope of the present disclosure. For example, a vertical flow may include a single horizontal flow.

In some implementations, defining 302 the at least one vertical flow and at least one horizontal flow associated with the at least one vertical flow may include associating 306 a unique parent IO request identifier and a unique instance identifier with a parent IO request. In one example, each IO trace of the plurality of IO traces (e.g., plurality of IO traces 400) may include a forty byte common header and thirty-two bytes of private data. However, these sizes (e.g., forty bytes and thirty-two bytes) are for example purposes only as the common header and/or the private data may be of any size. Flow performance analysis process 10 may modify the common header to include a unique parent IO request identifier (shown in FIG. 5 as "UUID"). The unique parent IO request identifier may identify a vertical flow instance. Accordingly, each vertical flow instance may have a unique parent IO request identifier. Referring again to the example of FIG. 5, suppose IO request 504 is a parent IO request of vertical flow 502. In this example, flow performance analysis process 10 may associate 306 a unique parent IO identifier (e.g., "UUID: AABC") with IO request 504.

Flow performance analysis process 10 may associate 306 a unique instance identifier with a parent IO request. For example, in addition to the unique parent IO request identifier that identifies a distinct vertical flow, flow performance analysis process 10 may associate 306 the parent IO request with a unique instance identifier to identify the parent IO request within a vertical flow relative to other IO requests of the vertical flow. As discussed above, the same unique parent IO request identifier may be associated 306 with each IO request of a vertical flow. To identify the relative sequence of the parent IO request within the vertical flow, flow performance analysis process 10 may associate 306 the parent IO request with a unique instance identifier. For example and as will be discussed in greater detail below, flow performance analysis process 10 may associate 306 the parent IO request with a unique instance identifier that includes a sequence of digits based upon the relative location of the IO request within the vertical flow. In some implementations, flow performance analysis process 10 may add a unique instance identifier field to the IO request data structure. In one example, the unique instance identifier may start with "0x1" in the topmost parent IO request. However, it will be appreciated that various unique instance identifiers may be used within the scope of the present disclosure.

Referring again to the example of FIG. 5, suppose IO request 504 is a parent IO request of vertical flow 502. In this example, flow performance analysis process 10 may associate 306 a unique instance identifier (e.g., "Instance ID: 0000000000101") with IO request 504. As will be discussed in greater detail below, the sequence of digits of the unique instance identifier may uniquely identify each horizontal flow and may identify the relative location or position of the IO request within the vertical flow.

In some implementations, defining 302 the at least one vertical flow and at least one horizontal flow associated with the at least one vertical flow may include associating 308 the unique parent IO identifier with at least one child IO request. For example, flow performance analysis process 10 may associate each child IO request with the unique parent IO identifier associated with its parent IO request. Referring again to FIG. 5, flow performance analysis process 10 may associate 308 the unique parent IO identifier (e.g., "UUID: AABC") with each child IO request (e.g., IO requests 506, 508, 510) of the parent IO request (e.g., IO request 504). In this manner, each IO request of a vertical flow may be identified by the same unique parent IO identifier.

In some implementations, defining 302 the at least one vertical flow and at least one horizontal flow associated with the at least one vertical flow may include associating 310 at least one unique instance identifier with each child IO request based upon, at least in part, the unique instance identifier associated with the parent IO request. As discussed above, a unique instance identifier may identify a relative location or position of an IO request within a vertical flow. In this manner, the unique instance identifier may define relationships among horizontal flows which belong to the same vertical flow.

As discussed above, flow performance analysis process 10 may add a unique instance identifier field to the IO request data structure. The unique instance identifier may be defined for a particular child IO request based upon, at least in part, the unique instance identifier associated with the parent IO request. For example, the unique instance identifier for a child IO request may be composed by copying the unique instance identifier of its parent IO request and adding a portion specific to the child IO request.

Referring again to the example of FIG. 5, suppose flow performance analysis process 10 associates 306 IO request 504 with a unique instance identifier of e.g., "0000000000101". In this example, flow performance analysis process 10 may associate 310 IO request 506, as a child IO request of IO request 504, with the unique instance identifier of its parent IO (e.g., "0000000000101" with an additional portion specific to IO request 506 (e.g., "1"). Accordingly, flow performance analysis process 10 may associate 310 IO request 506 with a unique instance identifier of e.g., "0000000001011". In this manner, the additional portion (e.g., "1") added to the unique instance identifier of its parent IO request may identify the relative location of IO request 506 within vertical flow 502 relative to IO request 504.

When associating 310 a unique instance identifier with a child IO request, the unique instance identifier may also be based upon other child IO requests. For example, suppose a parent IO request concurrently executes two IO requests. In this example, flow performance analysis process 10 may associate each child IO request from the same parent IO request with distinct unique instance identifiers based upon the unique instance identifier associated with the parent IO request. For example, flow performance analysis process 10 may associate 310 a unique instance identifier with IO request 508 based upon, at least in part, IO request 506 (e.g., "Instance ID: 0000000010111") and a unique instance identifier with IO request 510 based upon, at least in part, IO request 506 and IO request 508 (e.g., "Instance ID: 0000000010112"). In this example, flow performance analysis process 10 may associate 310 each child IO request of IO request 506 with a unique instance identifier based on the unique instance identifier of IO request 506 (e.g., "000000001011" and a portion specific to each child IO request (e.g., "1" for IO request 508 and "2" for IO request 510).

In some implementations, flow performance analysis process 10 may generate 304 a hierarchical representation of the plurality of IO traces with the at least one vertical flow and the at least one horizontal flow associated with the at least one vertical flow defined for the plurality of IO traces. For example, flow performance analysis process 10 may use the combination of the unique parent IO identifier and the unique instance identifier to filter all of the IO requests of a particular vertical flow. In this manner, flow performance analysis process 10 may generate 304 a hierarchical representation of the plurality of IO traces of a particular vertical flow that includes each horizontal flow of that vertical flow in the correct execution sequence relative to the other IO requests.

When generating 304 a hierarchical representation of the plurality of IO traces, flow performance analysis process 10 may utilize the unique instance identifier to differentiate IO requests from the same vertical flow. For example, flow performance analysis process 10 may shift and compare the unique instance identifier of each IO request / IO trace to determine a hierarchical relationship of each IO request relative to each other IO request. For example, suppose flow performance analysis process 10 receives plurality of IO traces 400 in response to executing 300 the plurality of IO traces on the storage system. In this example, flow performance analysis process 10 may generate a hierarchical representation of plurality of traces 400 with at least one vertical flow and at least one horizontal flow.

Flow performance analysis process 10 may identify each distinct unique parent IO request identifier to identify each vertical flow from the plurality of IO traces. In this example, flow performance analysis process 10 may identify e.g., two distinct unique parent IO request identifiers: "AABC" and "AABD". Accordingly, flow performance analysis process 10 may generate 304 a hierarchical representation of vertical flow 502 with IO requests 504, 506, 508, 510 and of vertical flow 522 with IO request 512 based on the unique parent IO request identifiers. Further, flow performance analysis process 10 may utilize the unique instance identifiers of each IO request of each vertical flow to generate 304 a hierarchical representation of horizontal flows 514, 516, 518, 520 for vertical flow 502 and horizontal flow 524 for vertical flow 522. In this manner, flow performance analysis process 10 may generate 304 a hierarchical representation of a plurality of IO traces that accounts for the respective hierarchical location of each IO request within at least one horizontal flow and at least one vertical flow.

In some implementations, generating 304 the hierarchical representation of the plurality of IO traces with the at least one vertical flow and the at least one horizontal flow associated with the at least one vertical flow defined for the plurality of IO traces may include reformatting 312 a list including the plurality of IO traces from a sequential execution representation to a hierarchical execution representation. Referring also to FIG. 6, when generating 304 a hierarchical representation of the plurality of IO traces, flow performance analysis process 10 may reformat 312 a list including the plurality of IO traces from a sequential execution representation (e.g., as shown in FIG. 4) to a hierarchical execution representation (e.g., as shown in FIG. 6). In this manner, flow performance analysis process 10 may utilize the at least one vertical flow and the at least one horizontal flow defined 302 for the plurality of traces to reformat 312 the list of IO traces in a hierarchical format or representation.

Flow performance analysis process 10 may reposition the plurality of IO traces into a hierarchical execution representation modeling how the plurality of IO traces are executed in the at least one vertical flow and the at least one horizontal flow. In some implementations, performance metrics may be defined hierarchically for the plurality of IO traces. For example, with the plurality of IO traces reformatted into a hierarchical execution representation, performance metrics may be defined for the at least one vertical flow and the at least one horizontal flow.

In some implementations, flow performance analysis process 10 may define 314 an execution latency for the at least one horizontal flow associated with the at least one vertical flow. As discussed above, IO traces may include timestamps associated with the execution of an IO request on a storage system. As such, flow performance analysis process 10 may define 314 an execution latency for the at least one horizontal flow by comparing the timestamps of IO requests of a horizontal flow. Referring again to FIG. 6, three vertical flows are shown with e.g., four horizontal flows within the first vertical flow; three horizontal flows within the second vertical flow; and three internal vertical flows with various horizontal flows within the third vertical flow. In this example, flow performance analysis process 10 may define an execution latency for each horizontal flow based upon, at least in part, the timestamps of each IO trace within the horizontal flow.

In some implementations, flow performance analysis process 10 may define 316 an execution latency for the at least one vertical flow based upon, at least in part, the execution latency defined for the at least one horizontal flow associated with the at least one vertical flow. Continuing with the above example, flow performance analysis process 10 may combine the execution latency defined 314 for the at least one horizontal flow associated with each vertical flow to define 316 an execution latency for the at least one vertical flow. In the example of FIG. 6, flow performance analysis process 10 may define 316 execution latencies of each vertical flow. In some implementations, flow performance analysis process 10 may combine the execution latencies of each vertical flow to define an overall latency for the plurality of traces.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network / a wide area network / the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer / special purpose computer / other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    executing a plurality of IO traces on a storage system;
    defining, for the plurality of IO traces, at least one vertical flow and at least one horizontal flow associated with the at least one vertical flow; and
    generating a hierarchical representation of the plurality of IO traces with the at least one vertical flow and the at least one horizontal flow associated with the at least one vertical flow defined for the plurality of IO traces.

2. The computer-implemented method of claim 1, wherein defining the at least one vertical flow and at least one horizontal flow associated with the at least one vertical flow includes associating a unique parent IO request identifier and a unique instance identifier with a parent IO request.

3. The computer-implemented method of claim 2, wherein defining the at least one vertical flow and at least one horizontal flow associated with the at least one vertical flow includes associating the unique parent IO identifier with at least one child IO request.

4. The computer-implemented method of claim 3, wherein defining the at least one vertical flow and at least one horizontal flow associated with the at least one vertical flow includes associating at least one unique instance identifier with each child IO request based upon, at least in part, the unique instance identifier associated with the parent IO request.

5. The computer-implemented method of claim 1, further comprising:
    defining an execution latency for the at least one horizontal flow associated with the at least one vertical flow.

6. The computer-implemented method of claim 5, further comprising:
    defining an execution latency for the at least one vertical flow based upon, at least in part, the execution latency defined for the at least one horizontal flow associated with the at least one vertical flow.

7. The computer-implemented method of claim 1, wherein generating the hierarchical representation of the plurality of IO traces with the at least one vertical flow and the at least one horizontal flow associated with the at least one vertical flow defined for the plurality of IO traces includes reformatting a list including the plurality of IO traces from a sequential execution representation to a hierarchical execution representation.

8. A computer program product residing on a non-transitory computer readable medium having a plurality of instructions stored thereon which, when executed by a processor, cause the processor to perform operations comprising:
    executing a plurality of IO traces on a storage system;
    defining, for the plurality of IO traces, at least one vertical flow and at least one horizontal flow associated with the at least one vertical flow; and
    generating a hierarchical representation of the plurality of IO traces with the at least one vertical flow and the at least one horizontal flow associated with the at least one vertical flow defined for the plurality of IO traces.

9. The computer program product of claim 8, wherein defining the at least one vertical flow and at least one horizontal flow associated with the at least one vertical flow includes associating a unique parent IO request identifier and a unique instance identifier with a parent IO request.

10. The computer program product of claim 9, wherein defining the at least one vertical flow and at least one horizontal flow associated with the at least one vertical flow includes associating the unique parent IO identifier with at least one child IO request.

11. The computer program product of claim 10, wherein defining the at least one vertical flow and at least one horizontal flow associated with the at least one vertical flow includes associating at least one unique instance identifier with each child IO request based upon, at least in part, the unique instance identifier associated with the parent IO request.

12. The computer program product of claim 8, wherein the operations further comprise:
    defining an execution latency for the at least one horizontal flow associated with the at least one vertical flow.

13. The computer program product of claim 12, wherein the operations further comprise:
    defining an execution latency for the at least one vertical flow based upon, at least in part, the execution latency defined for the at least one horizontal flow associated with the at least one vertical flow.

14. The computer program product of claim 8, wherein generating the hierarchical representation of the plurality of IO traces with the at least one vertical flow and the at least one horizontal flow associated with the at least one vertical flow defined for the plurality of IO traces includes reformatting a list including the plurality of IO traces from a sequential execution representation to a hierarchical execution representation.

15. A computing system comprising:
    a memory; and
    a processor configured to execute a plurality of IO traces on a storage system, wherein the processor is further configured to define, for the plurality of IO traces, at least one vertical flow and at least one horizontal flow associated with the at least one vertical flow, and wherein the processor is further configured to generate a hierarchical representation of the plurality of IO traces with the at least one vertical flow and the at least one horizontal flow associated with the at least one vertical flow defined for the plurality of IO traces.

16. The computing system of claim 15, wherein defining the at least one vertical flow and at least one horizontal flow associated with the at least one vertical flow includes associating a unique parent IO request identifier and a unique instance identifier with a parent IO request.

17. The computing system of claim 16, wherein defining the at least one vertical flow and at least one horizontal flow associated with the at least one vertical flow includes associating the unique parent IO identifier with at least one child IO request.

18. The computing system of claim 17, wherein defining the at least one vertical flow and at least one horizontal flow associated with the at least one vertical flow includes associating at least one unique instance identifier with each child IO request based upon, at least in part, the unique instance identifier associated with the parent IO request.

19. The computing system of claim 15, wherein the processor is further configured to:
    defining an execution latency for the at least one horizontal flow associated with the at least one vertical flow.

20. The computing system of claim 19, wherein the processor is further configured to:
    defining an execution latency for the at least one vertical flow based upon, at least in part, the execution latency defined for the at least one horizontal flow associated with the at least one vertical flow.

* * * * *